Oct. 25, 1932.  E. ROBERTS  1,884,873
CLUTCH PULLEY
Filed Dec. 9, 1930
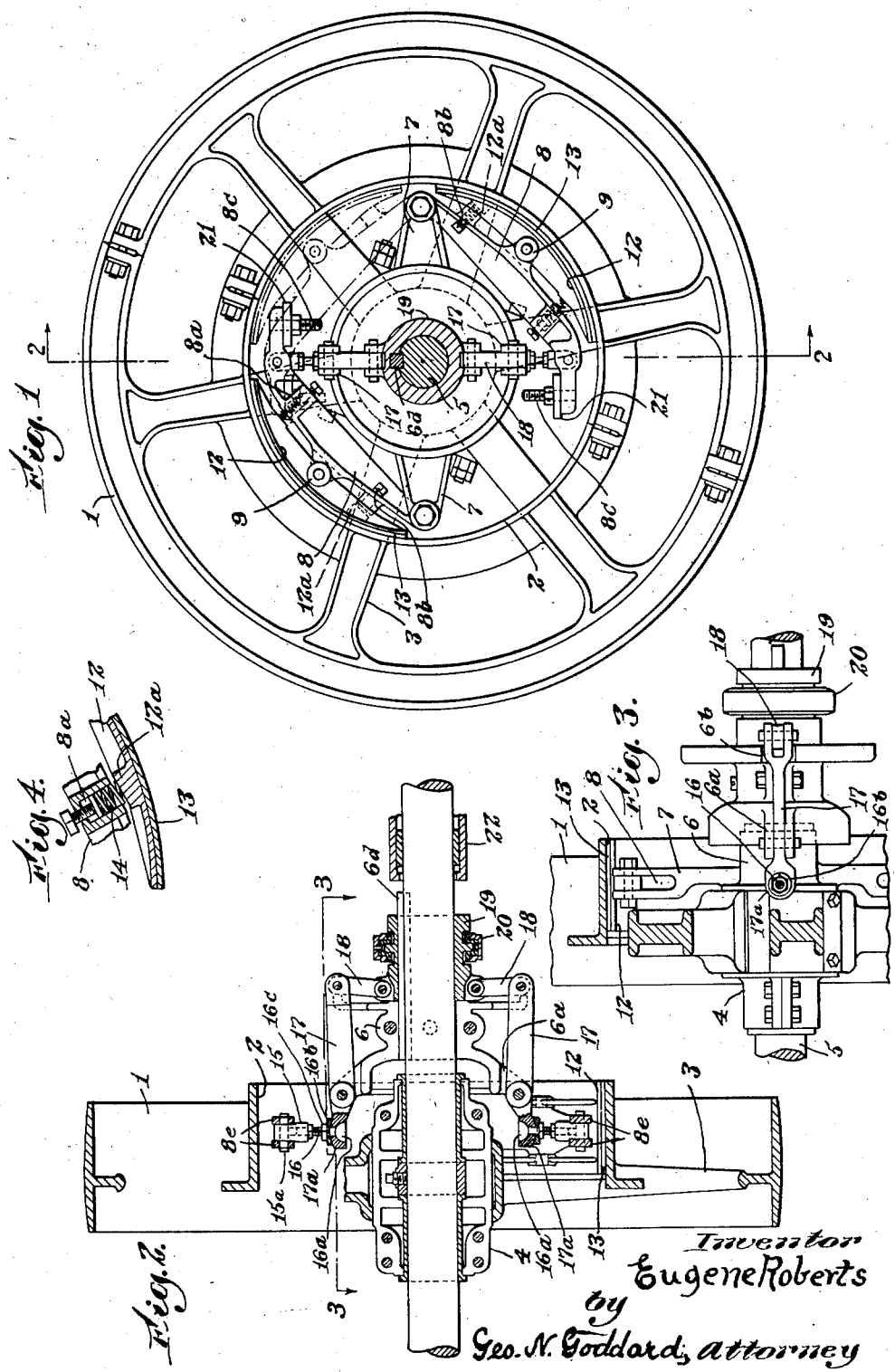
Inventor
Eugene Roberts
by
Geo. N. Goddard, Attorney Patented Oct. 25, 1932

1,884,873

UNITED STATES PATENT OFFICE

EUGENE ROBERTS, OF HASTINGS, NEW YORK, ASSIGNOR TO THE WESTERN STATES MACHINE COMPANY, OF SALT LAKE CITY, UTAH, A CORPORATION OF UTAH

CLUTCH PULLEY

Application filed December 9, 1930. Serial No. 501,001.

This invention relates to clutch pulleys and is particularly intended for use on the line shaft of a battery of belt driven centrifugal machines, or for the driving of other machinery where a quick pick-up for heavy loads is desired and one which is capable of ready adjustment to permit precise variation in the time of pick-up where the time factor is especially important.

To this end the invention is characterized by a pulley loosely mounted on a drive shaft and provided with a concentric clutch ring or rim adapted to receive engagement of centrifugally actuated, arcuate friction clutch shoes, which are pivotally mounted on supporting arms that are fulcrumed to a spider secured to the shaft to permit limited oscillation of the clutch shoes, combined with means controllable by the operator for retracting the pivotal arms against centrifugal force and thereby release the clutch shoes from engagement with the clutch rim of the pulley. These and other features of the invention will be particularly described in the following specification and will be defined in the claims hereto annexed.

In the accompanying drawing I have illustrated a simple and convenient construction and arrangement embodying the principles of this invention, in which Fig. 1 is an endwise elevation of the assembled pulley and clutch mechanism.

Fig. 2 is a central section on the plane 2—2 of Fig. 1.

Fig. 3 is a transverse section parallel with the shaft on the plane 3—3 of Fig. 2.

Fig. 4 is a detail view in central section of a portion of the brake shoe and its adjacent stop.

In the practice of the invention according to the form illustrated in the drawing, a belt pulley 1 is provided with an interior clutch rim or ring 2 having an internal supporting spider 3 adapted to be clamped upon a loose carrier hub 4, which rotates freely about the shaft, the pulley itself being split diametrically to permit its being clamped readily upon its supporting hub member without demounting the shaft.

Adjacent to the pulley hub is securely fastened to the shaft a split spider 6, whose clamping engagement holds it against axial movement on the shaft and which is held from rotation thereon by a spline $6^d$. The spider is provided with short projecting arms or lugs 7, which form a fulcral support for the forward end of pivotal levers 8, which levers intermediately of their ends are provided with bearing bosses 9 affording a pivotal support and connection with each of the arcuate clutch shoes 12 carried by the arms 8, which clutch shoes are externally faced with brake or clutch lining material 13 to form complete engagement with interior face of the clutch rim 2 against which the clutch shoes are thrust by centrifugal force acting on both the supported arms 8 and the clutch shoes themselves.

Stop members on either side of the pivotal support of the clutch shoe 12 are provided, embracing in this instance an inwardly projecting boss $12^a$ on the clutch shoe adapted to abut against a similar boss $8^a$ on the shoe-supporting arm. Either of these stops may be provided with a socket to receive a thrust spring 14, which exerts a light outward pressure against the rear end of the shoe, so that when the shoe moves outward under centrifugal force the rear end of the shoe will first form contact with the clutch rim before the forward end is in contact therewith, as I have found by experience that by ensuring engagement of the rear portion of the clutch shoe in advance of the forward portion a smooth firm engagement of the clutch is ensured but without chattering action, and this greatly promotes the efficiency of the clutch. To limit the pivotal movement of the clutch shoe under the pressure of the thrust spring, I provide a stop on the opposite side of the center of oscillation, this stop being preferably in the form of an adjustable screw which can be set to limit with precision the degree of oscillation of the shoe. Ordinarily it would be sufficient if the rear part of the clutch shoe establishes contact with the clutch rim, only about one-thirty-second of an inch in advance of the forward end, but the use of the stop screw $8^b$ permits variation in this distance.

To vary the power of the centrifugal action I have provided, preferably at the extreme rear end of the shoe-carrying arm 8, a weight carrying pin 8ᶜ upon which one or more weight discs 21 may be placed, the same being held securely in position by means of a nut threaded upon the pin 8ᶜ. By the removal or addition of weights the pressure of the centrifugally actuated brake shoe against the rim may be diminished or increased at will to suit particular requirements.

Provision is also made for enabling the operator to release the clutch to inactive position whenever desired and the particular mechanism employed in this instance embodies a self-locking feature which maintains the clutch out of engagement after it has once been set to inactive position until it is released by the operator.

The clutch-releasing mechanism comprises pivotal arms 17 extending lengthwise of the shaft and fulcrumed intermediate of their ends on opposite supporting arms 6ª of the spider 6. The short inner ends of these arms are pivotally connected through a transverse pivot pin with a clevis 16, which is connected by a short pivotal link 15 with the rear end portion of the adjacent shoe-carrying arm 8. Obviously, by forcing the outer long arms of the levers 17 outward the shoe-carrying arms 8 will be drawn inward toward the shaft, thus withdrawing the friction shoe 12 from clutching engagement with the clutch ring of the pulley. The outer ends of the lever 17 are forced outwardly by the expanding toggles 18 formed in two parts provided with threaded engagement to permit adjustment as to length. The inner ends of these toggle links are pivotally attached to a slidable sleeve 19 provided with a key way engaging the spline 6ᵈ to ensure rotation with the shaft and with the spider 6, which supports the clutch controlling mechanism previously described. The forked end of a shipper arm 20 loosely surrounding the sleeve 19 permits the operator to move the sleeve inward to retracting position, or outward to position for permitting the clutch to engage its clutch ring. The sleeve is arranged to pass inward beyond the dead center where it abuts against the adjacent end of the spider 6, so that it is locked against accidental endwise displacement while holding the clutch out of action. A stop collar 22 properly spaced from the sleeve 19 a predetermined distance serves to indicate the worn condition of the friction shoe lining material, it being spaced so that when the lining becomes worn to the point of inefficiency the clutch sleeve will come in contact with the adjacent end of the collar 22, thus giving plain indication that the clutch facing material requires renewal. To perform the function of the stop collar 22 one of the bearing bosses supporting the shaft may serve, as the clutch pulley shoes are suitably located in relation thereto to enable it to serve this particular purpose.

All of the parts are designed so that the position of the clutch arms and the friction shoes, which they carry, may be reversed in case the shaft runs in the opposite direction, since the arms 8 may be disengaged from their supporting spider arms and turned about end to end and reattached thereto in the opposite direction. Since the retracting mechanism is arranged at 90 degrees from the fulcral point of the arm, the retracting parts, which in one direction are connected with one shoe, are in the reverse arrangement connected with the other shoe.

In practice, any desired rapidity of pick-up can be given by proper setting and weighting of the clutch mechanism. Furthermore, with this arrangement the clutch facing material will always maintain a complete contact with the clutch rim throughout the whole length of its arc. Furthermore, this construction particularly lends itself to giving short impulses to the pulley when it is desired to rotate the centrifugal at a comparatively low speed when discharging the load of sugar by means of the well known discharger plow.

What I claim is:

1. A friction clutch pulley embracing in its construction, a pulley adapted to be loosely mounted on a shaft and having a concentric clutch rim, a spider adapted to be secured to the shaft adjacent to said pulley, shoe-supporting arms fulcrumed at their forward ends to said spider, centrifugally actuated arcuate clutch shoes pivotally mounted on the respective arms intermediate the ends of the arms and actuated by their own centrifugal force and the centrifugal force of their supporting arms to move into frictional clutching engagement with the interior face of said rim, and means under the control of the operator connected with said arms to retract the shoes from clutching engagement with said rim.

2. A friction clutch pulley embracing in its construction, a pulley adapted to be loosely mounted on a shaft and having a concentric clutch rim, a spider adapted to be secured to the shaft adjacent to said pulley, shoe-supporting arms fulcrumed at their forward ends to said spider, centrifugally actuated arcuate clutch shoes pivotally mounted on the respective arms intermediate the ends of the arms and actuated by their own centrifugal force and the centrifugal force of their supporting arms to move into frictional clutching engagement with the interior face of said rim, means under the control of the operator connected with said arms to retract the shoes from clutching engagement with said rim, and means for positioning said shoes to cause the rear end portions thereof to form clutching engagement with the friction rim in advance of such engagement of their forward ends.

3. A friction clutch pulley embracing in its construction, a pulley adapted to be loosely mounted on a shaft and having a concentric clutch rim, a spider adapted to be secured to the shaft adjacent to said pulley, shoe-supporting arms fulcrumed at their forward ends to said spider, centrifugally actuated arcuate clutch shoes pivotally mounted on the respective arms intermediate the ends of the arms and actuated by their own centrifugal force and the centrifugal force of their supporting arms to move into frictional clutching engagement with the interior face of said rim, means under the control of the operator connected with said arms to retract the shoes from clutching engagement with said rim, and means detachably connected with said arms for varying the strength of the centrifugal force exerted against the clutch rim.

4. A friction clutch pulley embracing in its construction, a pulley adapted to be loosely mounted on a rotatable shaft and having a concentric clutch rim, a spider adapted to be securely fastened to the shaft, shoe-supporting arms fulcrumed at their forward ends to said spider, centrifugally actuated arcuate clutch shoes pivotally mounted intermediate of their ends on the respective arms and actuated outward by the centrifugal force of the centrifugal arms and of the shoe to move into frictional clutching engagement with the interior face of said rim, and means for limiting the pivotal movement of the clutch shoes in relation to their supporting clutch arms, said means being normally set to cause the rear end of each shoe to engage the clutch rim in advance of the engagement by the forward ends of the shoes, and means connected with said arms for retracting the arms and the clutch shoes from clutching position.

5. A friction clutch pulley embracing in its construction, a pulley adapted to be loosely mounted on a rotatable shaft and having a concentric clutch rim, a spider adapted to be securely fastened to the shaft, shoe-supporting arms fulcrumed at their forward ends to said spider, centrifugally actuated arcuate clutch shoes pivotally mounted intermediate of their ends on the respective arms and actuated outward by the centrifugal force of the centrifugal arms and of the shoe to move into frictional clutching engagement with the interior face of said rim, and yielding means interposed between the shoe-supporting arms and the shoes for causing the rear ends of the shoes to form clutching engagement before the forward ends thereof are clutchingly engaged with the rim, and means connected with said arms for retracting the arms and the clutch shoes from clutching position.

6. A friction clutch pulley embracing in its construction, a pulley adapted to be loosely mounted upon a revoluble shaft and having a concentric frictional clutch rim, a spider adapted to be securely fastened to said shaft adjacent to said pulley, shoe-supporting arms pivotally fulcrumed at their forward ends to said spider, means under the control of the operator connected with the rear ends of said arms to retract them inwardly against centrifugal force, arcuate friction shoes pivotally mounted on, and outside of said arms to permit oscillation of the shoes in relation to said arms, adjustable means for positioning said shoes in relation to their supporting arms to cause the rear ends of the shoes to first form clutching engagement with said rim, and retracting means under the control of the operator and connected with the free ends of said arms whereby the arms may be retracted to disengage the arcuate shoes from the clutching rim at will.

7. A friction clutch pulley embracing in its construction, a pulley adapted to be loosely mounted for rotation on a central shaft and having a concentric frictional clutch rim, a spider adapted to be securely fastened to said shaft adjacent the clutch pulley, pivotal arms fulcrumed to said spider, arcuate friction clutch shoes pivotally supported on said arms and actuated by centrifugal force to move into clutching engagement with the interior face of said rim, and detachable weights secured to the free ends of said arms to vary the centrifugal force for actuating the clutch, and means connected with said arms for retracting the arms and the clutch shoes from clutching position.

8. In a device such as described, the combination with a rotary shaft, and a concentric friction rim unsecured thereto, of friction shoe members actuated by centrifugal force into frictional engagement with said rim, said friction shoe members embracing arms pivotally connected with the shaft, friction shoes pivotally connected with the free ends of the arms intermediate the ends of the shoes, and adjustable stop members to limit the pivotal movement of the shoes relative to the shoe arms, and means including retractile levers and toggle links for moving said shoes away from the rim and releasably holding them disengaged from the rim.

9. In a device of the character described, the combination with a rotary shaft and a concentric friction rim unsecured thereto, pivotal friction shoe members carried by the shaft in position to be engaged with the rim under the action of centrifugal force, said shoe members embracing friction shoes pivotally mounted on swinging arms, means for limiting the pivotal movement of the shoes on the arms, means for adjusting the shoe limiting devices to compensate for wear of the friction shoes, shoe retracting means operable at will to disengage the shoes from the rim, and means associated with the shoe retracting means when the shoes have reached their limit of wear.

10. A friction clutch pulley adapted to be loosely mounted on a shaft and having a concentric friction rim, a spider securely fastened to the shaft adjacent said pulley, shoe-carrying arms fulcrumed to said spider and movable outwardly under centrifugal force, friction clutch shoes pivotally attached to said arms intermediate the ends thereof and movable outward under centrifugal force exerted upon the shoes and upon said arms to form frictional clutching engagement with said rim, manually operable means interconnected with said arms to draw the clutch shoes inward out of engagement with said rim, and means for limiting the outward movement of the clutch shoes under centrifugal force when the frictional faces of the shoes have been worn to a predetermined point.

11. A transmission clutch embracing in combination with an idler transmission pulley provided with a friction rim and a coaxially disposed drive shaft, a spider secured to said drive shaft, centrifugally actuated shoe-carrying arms pivotally fulcrumed at their forward ends to said spider, arcuate friction shoes pivotally connected intermediate of their ends to said arms respectively and actuated by their own centrifugal force and that of their supporting arms outwardly against said friction rim, retracting links connected with the free end portions of said arms, and means for retracting and positively maintaining said links in retracted position against the pull exerted by centrifugal force.

12. A transmission clutch embracing in combination with an idler transmission pulley provided with a friction rim and a coaxially disposed drive shaft, a spider securely fastened to the drive shaft adjacent said pulley, centrifugally actuated shoe-carrying arms fulcrumed at their forward ends to said spider, arcuate friction clutch shoes pivotally secured intermediate their ends to said arms, the rear end of each shoe overbalancing the forward end to insure prior contact of the rear ends with the friction rim, and means controllable at will interconnected with said arms to draw the arms and the clutch shoes inward out of engagement with said rim and normally acting to retain them out of engagement.

In witness whereof, I have subscribed the above specification.

EUGENE ROBERTS.